Patented Jan. 8, 1952

2,581,464

UNITED STATES PATENT OFFICE 2,581,464

EPOXIDE COMPOSITIONS

John D. Zech, Anchorage, Ky., assignor to Devoe & Raynolds Company, Inc., Louisville, Ky., a corporation of New York No Drawing. Application September 16, 1947, Serial No. 774,429

8 Claims. (Cl. 260—348)

This invention has to do with epoxides, and, more particularly, has to do with a new and novel class of halogen-containing ether epoxides.

For a clear understanding of the reactants, products and process of this invention, the following definitions are set forth. As used herein, the term "epoxide" denotes a compound characterized by the presence of at least one cyclic ether group, namely one wherein an ether oxygen atom is attached to two adjacent carbon atoms thereby forming a cyclic structure. The term "epoxy" also describes the foregoing cyclic ether group. The language "epoxide compositions" and "epoxy" compositions refers to compositions in which one or more epoxides are present. The epoxides present in such compositions may contain one or a plurality of epoxide groups. The term "ether epoxide" as used herein identifies an epoxide characterized by at least one of the aforesaid epoxide groups and by at least one ether oxygen linkage, carbon to oxygen to carbon in a non-cyclic group, in contrast with a cyclic ether group. The term "halogen-containing ether epoxide" denotes an ether epoxide of the foregoing type wherein one or more halogen atoms are present. Similarly, the term "halogen-containing ether epoxide compositions" is used to describe a composition predominantly comprised of at least one such epoxide. The nature of the halogen in said ether epoxides is more fully described herein below in connection with the description of the polyhalohydrin ethers from which said halogen-containing ether epoxides are formed.

The term "polyhalohydrin ether" describes aliphatic, cycloaliphatic and aryl-substituted aliphatic compounds, all of which are characterized by the following:

(a) At least one non-cyclic ether linkage,
(b) At least one hydroxyl group attached to a carbon atom, forming a carbinol group,
(c) Two or more halogen atoms,
(d) At least one of said halogen atoms being attached to a carbon atom adjacent to a carbinol group, and
(3) At least one of said halogen atoms (c) being attached to a carbon atom not adjacent to a carbinol group.

The term "polyhalohydrin ether" is used here, however, in a somewhat restricted sense, in that such compounds of chlorine, bromine and/or iodine are included, and those containing only fluorine halogen are excluded. That is, polyfluorhydrin ethers containing only fluorine as a characterizing halogen atom, are excluded; however, polyhalohydrins containing chlorine, bromine and/or iodine attached to a carbon atom adjacent to a carbinol group (see (d) above), in addition to fluorine, are contemplated herein. This limitation is imposed in view of the relative stability of the carbon-fluorine bond or, in other words, the relative lack of reactivity of fluorine in such compounds. "Polyhalohydrin ether composition" and "polyhalohydrin ether compositions," indicate a composition or compositions in which one or more of the aforesaid polyhalohydrin ethers predominate.

"Partial dehydrohalogenation," as used herein, describes a process wherein a hydrogen halide is removed from a polyhalohydrin ether to form new and novel halogen-containing ether epoxide. As indicated above in describing a polyhalohydrin ether, the hydrogen halide removed is predominantly a chloride, bromide or iodide, and the halogen thereof is predominantly the halogen which had been attached to a carbon atom adjacent to a carbinol group of said polyhalohydrin ether.

Applying the foregoing defining language, the new and novel class of halogen-containing ether epoxides of this invention are those obtained by: condensing an epihalohydrin, preferably an alpha-epihalohydrin, with a polyhydric compound in the proportion of at least about two molar quantities of said epihalohydrin per molar quantity of said polyhydric compound whereby a polyhalohydrin ether is formed, said polyhalohydrin ether containing at least one non-cyclic ether linkage, at least one carbinol group, two or more halogen atoms, at least one of said halogen atoms being attached to a carbon atom adjacent to a carbinol group and at least one of said halogen atoms being attached to a carbon atom not adjacent to a carbinol group; partially dehydrohalogenating said polyhalohydrin ether with an alkaline material whereby a reaction mixture containing a halogen-containing ether epoxide is formed, the halogen attached to a carbon atom adjacent to a carbinol group of said polyhalohydrin ether being substantially removed therefrom by said dehydrohalogenation and the halogen attached to a carbon atom not adjacent to a carbinol group of said polyhalohydrin ether being substantially unreacted and characterizing said ether epoxide; and separating said halogen-containing ether epoxide, or a fraction predominantly comprised of one or more such ether epoxides, from said reaction mixture. These halogen-containing ether epoxide reaction mixtures and products are polyether polyepoxide reaction products which in general contain at least three non-cyclic ether (—O—) linkages, terminal epoxide-containing ether

groups, and halogen attached to a carbon of an intermediate

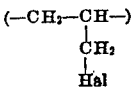

group.

These halogen-containing polyether polyepoxide reaction products, obtainable by partial dehydrohalogenation of polyhalohydrin alcohols may be considered to have the following general formula

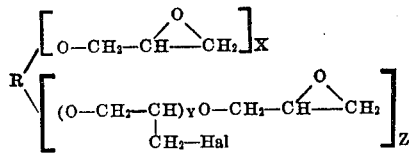

in which R is the residue of the polyhydric alcohol which may contain unreacted hydroxyl groups, X indicates one or more of the epoxy ether groups attached to the alcohol residue, Y may be one or may vary in different reaction products of the reaction mixture from O to more than one, and Z is one or more, and X+Z, in the case of products derived from polyhydic alcohols containing three or more hydroxyl groups averages around two or more so that the reaction product contains on the average two or more than two terminal epoxide groups per molecule. These new and novel ether epoxides, and the preparation thereof, are described in detail herein below.

POLYHALOHYDRIN ETHERS

In forming the aforesaid halogen-containing ether epoxides contemplated herein, an epihalohydrin and a polyhydric alcohol, are first condensed, in the aforesaid proportions, in the presence of a suitable condensation catalyst whereby a polyhalohydrin ether or mixture of polyhalohydrin ether is formed. It will be understood that, in view of the high degree of chemical functionality of the aforesaid reactants, small amounts of other condensation products may be present with the polyhalohydrin ether or ethers. Such by-products, however, may be present during the subsequent partial dehydrohalogenation and do not interfere with the course of such treatment. As indicated herein above, at least about two molar quantities of an epihalohydrin is used for each molar quantity of the polyhydric compound. While this is the lower limit of the proportion range, a large excess of the epihalohydrin may also be used, whereupon satisfactory polyhalohydrin ethers are formed, which when partially dehydrogenated, provide one or more of the halogen-containing ether epoxides. The preferred range of proportions for the preparation of the most desirable products, however, are the following. With the dihydric reactant, substantially two to four molar quantities of an epihalohydrin are used for each molar quantity of dihydric reactant; expressed in another manner, substantially one to two molar quantities of epihalohydrin are used for each hydroxyl group of the dihydric reactant. For a trihydric reactant, the preferred range is substantially two to six molar quantities of an epihalohydrin for each molar quantity of trihydric reactant, or substantially ⅔ to 2 molar quantities of epihalohydrin are used for each hydroxyl group of the trihydric reactant. Continuing, substantially two to eight molar quantities of an epihalohydrin are used for each molar quantity of a tetrahydric reactant, or substantially ½ to 2 molar quantity of epihalohydrin for each hydroxyl group of tetrahydric reactant. The preferred range of proportions for polyhydric reactants having more than four hydroxyl groups will now be readily recognized from the foregoing.

As the proportions of epihalohydrin and polyhydric compound are varied within the aforesaid ranges, the character of the polyhalohydrin ethers formed therefrom is somewhat modified. In turn, the halogen-containing ether epoxides derived from the polyhalohydrin ethers are also varied. For example, a substantially colorless halogen-containing ether epoxide composition, averaging about 2.1 epoxide groups per molecule, is obtained when about three moles of epichlorhydrin are condensed with one mol of glycerol in the presence of BF₃, and the very viscous, substantially colorless polyhalohydrin ether composition so formed is treated with an alkaline material of the type described. A halogen-containing ether epoxide composition characterized by a relatively large number of hydroxyl groups may be prepared in a similar manner, but with two mols of epichlorhydrin being used per mol of glycerol. The latter ether epoxide compositions are rather sensitive to polymerization (resembling glycidol in this characteristic), more so than the corresponding ether epoxide compositions obtained by using an epichlorhydrin to hydroxyl group ratio of about 1 (as three mols of epichlorhydrin per mol of glycerol).

Polyhydric alcohols which may be used for the preparation of the aforesaid polyhalohydrin ethers are illustrated by the following:

(a) Polyhydric alcohols—
   Ethylene glycol
   Propylene glycol
   Trimethylene glycol
   2,3-butanediol
   1,4-dihydroxy-2-butene
   1,12-dihydroxy octadecane
   1,4-dihydroxy cyclohexane
   2,2-dimethyl-1, 3-propanediol
   2-ethyl-2 butyl propanediol-1,3
   Glycerol
   Erythritol
   Sorbitol
   Mannitol
   Inositol
   Trimethylol propane
   Pentaerythritol
   Polyallyl alcohol
   Bis (4-hydroxycyclohexyl) dimethyl methane
   1,4-dimethylol benzene
   4,4'-dimethylol diphenyl
   Dimethylol xylenes
   Dimethylol toluenes
   Dimethylol naphthalenes, etc.

(b) Polyhydric ether alcohols—
   Diglycerol
   Triglycerol

Dipentaerythritol
Tripentaerythritol
Dimethylolanisoles
Beta hydroxyethyl ethers of polyhydric alcohols and phenols, such as—
  Diethylene glycol
  Polyethylene glycols
Bis(beta hydroxyethyl ether) of hydroquinone
Bis(beta hydroxyethyl ether) of bisphenol
Betahydroxyethyl ethers of glycerol, pentaerythritol, sorbitol, mannitol, etc.;
Condensates of alkylene oxides such as ethylene oxide, propylene oxide; butylene oxide, isobutylene oxide, glycidol, epichlorhydrin, glycid ethers, etc. with polyhydric alcohols such as the foregoing and with polyhydric thioether alcohols such as—
  2,2'-dihydroxy diethyl sulfide
  2,2', 3,3'-tetrahydroxy dipropyl sulfide
  2,2', 3-trihydroxy-3'-chlordipropyl sulfide, etc.
(c) Hydroxy-aldehydes and ketones—
  Dextrose
  Fructose
  Maltose
  Glyceraldehyde, etc.
(d) Mercapto (thiol) alcohols—
  2-mercapto ethanol
  Alpha-monothioglycerol
  Alpha alpha' dithioglycerol, etc.
(e) Hydroxy esters—
  Monoglycerides, such as monostearin
  Ethylene glycol dilactate
  Monoesters of pentaerythritol, e. g. a monoacetate, etc.
(f) Halogenated alcohols (halohydrins)—
  Glycerol monochlorhydrins
  1,4-dichloro-2, 3-hydroxy butane
  Monochloride of pentaerythritol
  Monochlorohydrins of sorbitol
  Dichlorohydrins of sorbitol
  Monochlorohydrins of mannitol
  Dichlorohydrins of mannitol Epihalohydrins used in preparing the aforesaid polyhalohydrin ethers include epichlorhydrin, epibromhydrin and epiiodohydrin, and are preferably in alpha form. The latter materials are all characterized by a three carbon chain; however analogs of the aforesaid epihalohydrins may also be used. Examples of the latter are beta- and gamma - methyl epichlorhydrins, 1,4-dichloro-2, 3-epoxy butane; etc. It will be noted that epifluorhydrin and its analogs are not referred to above. Inasmuch as fluorine is rather unreactive in such epoxy compounds, the latter are not contemplated herein. Accordingly, the term "epihalohydrin" as used in connection with the preparation of complex halohydrins, throughout the specification and appended claims, defines compounds in which the halogen is chlorine, bromine and iodine, and is exclusive of fluorine. In view of its availability and relatively low cost, epichlorhydrin is preferred.

Other suitable compounds which may be reacted with epihalohydrins to form polyhalohydrin ethers which, in turn, may be partially dehydrohalogenated to valuable halogen-containing ether epoxide compositions, include polymercaptans, such as trithioglycerol, ethylene dimercaptan, p-xylene dimercaptan, thioglycollic esters of polyhydric alcohols, etc.

Hydroxyepoxides, in place of epihalohydrins, may be reacted with suitable halogen-containing compounds to form polyhalohydrin ethers, the latter providing valuable halogen-containing ether epoxides when partially dehalohydrogenated. Typical of such hydroxy epoxides is glycidol. Representing the halogen-containing compounds are organic polybasic halides, such as phthallyl dichloride, etc.; the inorganic acid halides, such as PCl₃, POCl₃, SiCl₄, SOCl₂, SCl₂ etc.; diethyl dichlorsilane, ethyl dichlorsilane; etc.

Along with epihalohydrins you may also use diepoxides, such as diglycide ether, butadiene dioxide etc. Such a mixture of diepoxides and epihalohydrins may be condensed with any of the polyhydric compounds listed above (a through g) to form polyhalohydrin ethers which yield halogen-containing ether epoxide compositions upon dehydrohalogenation.

As aforesaid, condensing catalysts are used in reacting an epihalohydrin with a polyhydric alcohol, for the formation of a polyhalohydrin ether or polyhalohydrin ether composition. Typical catalysts are those of the Friedel-Crafts type, including anhydrous AlCl₃, BF₃, ZnCl₂, FeCl₃, SnCl₄, and complexes such as the well known BF₃ etherates, etc.; acid type catalysts including HF, H₂SO₄, H₃PO₄ etc.; basic type catalsts such as NaOH, KOH, sodium acetate, etc.; others such as SbCl₅ etc. Concentration of catalyst may be varied, depending upon the individual catalyst. For example, from about 0.1% to about 0.2% of BF₃ or a complex thereof, based upon the total quantity of reactants, provide satisfactory results. When greater concentrations of the latter catalysts are used, the resulting polyhalohydrin ether compositions are generally darker in color. In general then, the converting catalyst is used in small concentration, up to about 5% but generally less than 1% of the total reactants, particularly when BF₃ type catalysts are employed. With certain of the less active catalysts, i. e. SbCl₅ etc., larger amounts may be used to advantage.

The polyhalohydrin ethers are advantageously formed by reacting the epihalohydrin and polyhydric alcohol or polyhydric phenol, in the presence of a suitable condensing catalyst, at a temperature between about 25° C. and about 175° C. In general, temperatures above about 130° C. cause some darkening in color of the polyhalohydrin ether composition, but may be advantageously used when very light color is no object. For example, temperatures of the order of 130–175° C. are advantageous with high melting polyhydric alcohols, such as mannitol, pentaerythritol, polypentaerythritols, etc. Further, temperatures of the order of 25° C. generally provide a slow reaction rate, unless relatively large concentrations of catalysts are used. Most satisfactory results, that is, proper rate of reaction and light color of product, are obtained with temperatures in the neighborhood of 75–125° C.

The condensation of an epihalohydrin and a polyhydroxy compound may be carried out in any one of several ways. For example, the two reactants may be mixed at room temperature and the catalyst may be added thereto. Condensation is relatively slow initially, becoming more rapid as the temperature rises due to the liberation of heat. Generally, the temperature rises appreciably so that efficient cooling must be applied to prevent violent reaction. A preferred method involves adding the catalyst to the hydroxy compound and then adding the epihalohydrin thereto gradually at a temperature of about 50–125° C. This provides a more uniform product and greater control over the reaction. Inasmuch as the reaction is exothermic, cooling can be applied to shorten the time required for the addition of the epihalohydrin. By proper adjustment of the rate of cooling and rate of addition of the epihalohydrin, the reaction can be carried out at the desired temperature in a minimum period of time.

In carrying out the reaction of the polyhydroxy compound and the epihalohydrin, it is advantageous to use a solvent with certain high melting, relatively insoluble alcohols. By way of illustration, pentaerythritol and polypentaerythritol and polypentaerythritols are difficultly soluble and high melting. Polyhydric alcohols, such as ethylene glycol, glycerol, diglycerol and trimethylol propane are the most satisfactory solvents for the pentaerythritols, when the latter are condensed with epihalohydrins. Naturally these solvents, as polyhydroxy compounds, also condense with the epihalohydrins; as a result, an extremely complex polyhalohydrin ether composition is formed, rather than a relatively simple, pentaerythritol—epihalohydrin condensate. But this in no way detracts from the usefulness of such compositions which may be separated if desired into their component parts by certain methods such as solvent extraction, precipitation, fractionation, etc.

*Partial dehydrohalogenation*

As indicated herein above, alkaline materials are used to partially dehydrohalogenate the aforesaid polyhalohydrin ethers, thereby providing the desired halogen-containing epoxide ethers. In general, a number of alkaline materials may be used for the dehydrohalogenating agents, with varying degrees of efficiency. Numerous alkaline materials are known for dehydrohalogenating halohydrins to produce epoxides and all such materials, and procedures for using the same, are contemplated herein. For example, aqueous and anhydrous sodium hydroxide may be used, the latter being shown in Patent No. 1,446,872. A large number of basic reacting metal salts of strong bases and weak acids are shown as dehydrohalogenating agents in Patent Nos. 2,061,377; 2,070,990; 2,224,849; 2,248,635 and 2,314,039. Illustrative of such alkaline materials are: sodium and potassium carbonates and bicarbonates; borax; hydroxides of magnesium, zinc, lead, iron and aluminum, and the corresponding oxides; etc. While such materials may be used, yields of the desired halogen-containing ether epoxides are generally small, in view of undesirable side-reactions. It has been noted that strong alkalies tend to hydrolyze and polymerize epoxides, thereby reducing the yield. Further, powdered sodium and potassium hydroxides, require low reaction temperatures to reduce their polymerization action, when suspended in non-aqueous liquids. Similarly, powdered lime, or $Ca(OH)_2$, is relatively slow in reacting with halohydrins in non-aqueous media, yet it exercises a pronounced polymerization effect on the epoxide product or products. A number of the previously mentioned basic reacting metal salts of strong bases and weak acids have been found to be only slightly efficient in converting the polyhalohydrin ethers to the halogen-containing ether epoxides when used in non-aqueous media. Sodium acetate has no value whatsoever for this purpose. Moreover, some alkaline materials such as sodium cyanide, sodium sulfide etc., do not dehydrohalogenate but instead remove the halogen to give undesirable derivatives. Ammonia and amines, with the exception of tertiary amines are also unsuitable basic reagents. For this reason in this specification and the appended claims, the term inorganic alkali material is intended to include the oxides and hydroxides of the alkali and alkaline earth metals, together with the alkali metal aluminates, silicates and zincates.

As pointed out in application Serial No. 754,080, filed June 11, 1947, now Patent 2,538,072, Jan. 16, 1951, of which this application is in part a continuation, it has been found that certain aluminates, silicates and zincates are outstanding dehydrohalogenating agents when used in substantially, or completely, non-aqueous media. Generally no water is added to the reaction mixture although exceptions may be made, particularly in the case of sodium aluminate as pointed out hereinbelow. In such a medium, these new dehydrohalogenating materials effectively remove hydrogen halide from polyhalohydrin ethers and, yet, have little or no tendency to induce polymerization or hydrolysis of the halogen-containing ether epoxides so formed. These partial dehydrohalogenating materials are basic-reactive metal aluminates, silicates, and zincates, of which the alkali metal and particularly sodium and potassium, compositions are preferred. Representative of such materials are the following:

A. Aluminates of alkali metals, such as $Na_3AlO_3$, $Na_2AlO_4$, $Na_2Al_2O_4 \cdot xH_2O$ (where $x$ represents the quantity of associated water), $K_2Al_2O_4$.

B. Zincates of alkali metals, principally sodium and potassium.

C. Silicates of alkali metals, either anhydrous or hydrated orthosilicates, metasilicates, disilicates, trisilicates, sesquisilicates, etc. Typical of such materials are $Na_2SiO_3 \cdot 5H_2O$, $$3Na_2 \cdot 2SiO_2 \cdot 11H_2O,$$

 $Na_4SiO_4$ and $Na_2SiO_3$.

The conditions required for a high degree of conversion of a polyhalohydrin ether to a halogen-containing ether epoxide varies somewhat with the foregoing aluminates, silicates, and zincates. When sodium aluminate is used, it is preferred to carry out the reaction at temperatures of the order of 70–105° C., although satisfactory results are obtained with temperatures from about −25° C. to about 125° C. With temperatures below about 70° C. the reaction time is relatively long. With temperatures within the preferred range of 70–105° C., reaction is usually complete in 1–3 hours, with quantities of reactants such as shown in the following illustrative examples. The quantity of sodium aluminate used with the polyhalohydrin ether may be varied considerably. A quantity containing a slight excess is generally desirable; that is, the quantity of sodium aluminate used is such that the sodium content is slightly in excess of the halogen content of the polyhalohydrin ether reactant. Even a large excess of sodium aluminate may be used without decreasing the yield of halogen-containing ether epoxide product, thus illustrating the absence of a polymerization effect. It has been further discovered that particularly outstanding results are realized when a small amount of water is used with sodium aluminate in the reaction. The quantity of water used is preferably of the order of about 1% to about 15% of the quantity of sodium aluminate, but as much as about 30% of water may be used with a large quantity of a water-miscible organic diluent. If substantially larger quantities of water are used, the yield of halogen-containing ether epoxide product is decreased, perhaps, by hydrolysis and/or polymerization of the product. Outstanding for use herein are sodium and potassium aluminates.

With regard to zincate reactants, the sodium salts are again preferred in view of their excellent characteristics and availability. These salts appear to be more reactive than the corresponding aluminates. Thus, somewhat lower temperatures and shorter reaction periods may be used. In general, a reaction period of ½ hour to 1 hour at 70° C., with quantities of reactants such as shown in the following typical examples, provides excellent conversion of polyhalohydrin ether to a halogen-containing ether epoxide. Reaction temperature may be advantageously varied, however, from about −25° C. to about 125° C., with reaction periods varying from ½ hour to about 10 hours. The quantity of zincate used with a polyhalohydrin ether preferably varies from about an equivalent quantity to about ⅓ of an equivalent; an equivalent quantity of zincate is one containing a quantity of alkali metal, e. g. sodium, equivalent to the halogen content of the polyhalohydrin ether. By way of illustration, the reaction of three mols of epichlorhydrin with one mol of ethylene glycol provides a mixture of polyhalohydrin ethers. One such polyhalohydrin ether which is most probably present, and which, as suggested above, contains some relatively unreactive chlorine in addition to some reactive chlorine, is the following:

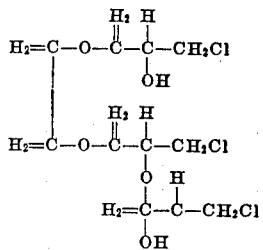

With such a polyhalohydrin ether, the quantity of sodium zincate used should preferably be equivalent to about ⅔ of the chlorine present therein, and the ether epoxide formed therefrom would contain chlorine.

Particularly preferred of the zincates is a sodium zincate having a zinc oxide content of about 30%, and a sodium oxide content of about 42%.

On dehydrohalogenation the polychlorhydrin ether of the formula above indicated will be converted for the most part into a chlorine-containing polyether polyepoxide of the following formula:

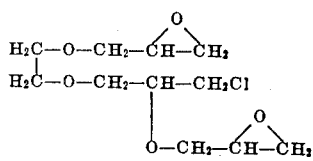

The silicates listed above are illustrative of a relatively large number which may be used herein. Generally, the reaction conditions are substantially the same as those resorted to when the aluminates and/or zincates are involved. That is, reaction temperatures from about −25° C. to about 125° C., and reaction periods of from about ½ hours to about 10 hours are satisfactory; preferred, however, are temperatures of the order of 50 to 105° C. and reaction periods of ½ to 3 hours. The very highly alkaline silicates are preferably used in substantially theoretical quantities with the polyhalohydrin ether condensates, as described above in connection with zincate reactants. In order to realize the maximum benefit of the alkali metal content of the anhydrous silicates, they should be finely powdered before use. This may be suitably accomplished by known methods, such as grinding in a ball mill, rolling mill, etc. Typical silicates which provide better results when finely powdered are anhydrous sodium meta-, sesqui-, and ortho-silicates; such materials are extremely hard and glass-like. Particular preference is given herein to the following silicates: anhydrous sodium ortho silicate; hydrated sodium meta and sesqui silicates.

Several relationships influence the efficacy of the dehydrohalogenating reagents. Among these are +particle size and surface area; and amphoteric metal oxide content, such as $Al_2O_3$, $SiO_2$, ZnO. As previously indicated, the extremely hard, glass-like anhydrous silicates are more effective when finely powdered. Most effective use of these materials is realized when the particle size is low as of the order of 60 mesh or finer. This relationship is of less import with hydrated silicates, aluminates and zincates, which generally disintegrate or disperse readily in the polyhalohydrin ether-solvent mixture. Even with the latter salts, however, it is preferred that the particle size be relatively small, and of the character noted in connection with the finely powdered silicates.

As indicated herein above, the partial dehydrohalogenation treatment is affected in a nonaqueous, or substantially non-aqueous medium when the aforesaid aluminates, silicates, and/or zincates are used. Organic solvents or diluents which may be used, and which are substantially unreactive in this treatment, include: hydrocarbons such as benzene, toluene, etc.; ketones such as acetone, methyl ethyl ketone, etc.; ethers typified by diethyl ether, methylal, dichlorethyl ether (chlorex), 1,3-dioxolane and dioxane; halides such as ethylene dichloride, carbon tetrachloride, etc. Of such solvents, dioxane is particularly satisfactory, and is preferred. In general, organic solvents which are infinitely miscible with water appear to facilitate filtration, especially when sodium zincate is used as the partial dehydrohalogenating agent. With ketones, such as acetone, a small amount of aldol type condensation may occur, particularly with sodium zincate or sodium orthosilicate, leading to the formation of diacetone alcohol and/or mesityl oxide; this in no way effects the yield of halogen-containing ether epoxide.

In the partial dehydrohalogenation reaction, with the preferred alkaline materials, the polyhalohydrin ether or polyhalohydrin ether composition and the aluminate, silicate and/or zincate are brought together in the proportions indicated above. Reaction may be carried out at temperatures from about −25° C. to about 125° C. The preferred temperatures, however, are indicated above in the discussion of the various aluminates, silicates and zincates. The partial dehydrohalogenation material and the polyhalohydrin ether react with the formation of an alkali halide. Presumably, the alkali metal of the aluminate, for example, reacts with the halogen acid removed from the polyhalohydrin ether, with the formation of an alkali metal halide. The halogen so removed from the said ether is predominantly halogen attached to a carbon atom adjacent to a carbinol group of said ether. The halogen thereof not so positioned is substantially unreacted. Apparently no aluminum halide is formed in the reaction; however, $Al(OH)_3$ and/or $Al_2O_3$ is formed. At the end of the reaction period, the reaction mixture is filtered through a suitable filter medium, e. g. diatomaceous earth, to remove alkali metal halide, alumina, hydrated alumina and excess aluminate (if an excess had been used). The filter cake so formed is washed with solvent to remove traces of product entrained therein. The alumina may be recovered from the filter cake and reconverted to an alminate by known procedure. The solvent is then recovered by distillation as the distillate, leaving the halogen-containing ether epoxide product as a residue in the case of a relatively non-volatile ether epoxide product. When the ether epoxide product is volatile, it may be obtained as a fraction of the total distillate. It is generally desirable, however, to remove the solvent by vacuum distillation, in order to avoid heating the ether epoxide products to high temperatures.

When sodium zincate is used in the dehydrohalogenation treatment, sodium chloride and ZnO or $Zn(OH)_2$ are formed. These by-products, and any excess zincate, are removed from the reaction by filtration as when an aluminate is used. The zinc oxide may be recovered from the filter cake and reconverted to a zincate by known procedure. Sodium zincate is somewhat more advantageous than the corresponding aluminate, in that it is somewhat more reactive. As indicated above, lower reaction temperatures and shorter reaction periods may be used; so also, less zincate is required for a given conversion of halohydrin to epoxide. As a result, a smaller filter cake is obtained; also less solvent is required for washing the filter cake. In addition a smaller filter press is required.

When a sodium silicate is used, sodium chloride and $SiO_2$ and/or its hydrates are formed. As with treatment with an aluminate and/or zincate, these by-products may be removed by filtration. Certain silicates are particularly convenient for use in the dehydrohalogenating treatment, inasmuch as they are converted therein to a stiff paste which clings to the sides of the reaction vessel in which the treatment is effected. At the end of the reaction treatment, filtration is unnecessary; the solution of halogen-containing ether epoxide product may be simply poured from the reaction vessel, or may be siphoned therefrom. Hydrated silicates are so characterized.

The halogen-containing ether epoxide compositions prepared as indicated by the foregoing may be fractionated by various fractionation procedures well known in the chemical art. For example, they may be subjected to vacuum fractionation, solvent fractionation, chromatographic fractionation, etc.

In affecting the aforesaid partial dehydrohalogenation, super-, and subatmospheric pressures may be used. For instance, when a low boiling solvent, such as diethyl ether, is involved superatmospheric pressure is advantageous. Also, the partial dehydrohalogenation may be carried out in a batch or a continuous operation.

ILLUSTRATIVE EXAMPLES

The following examples are provided to illustrate the invention; and are not to be construed as limitations thereof. The examples illustrate the individual halogen-containing ether epoxides contemplated herein and, in addition, illustrate the various polyhydric ethers and partial dehydrohalogenating materials used in preparing said ether epoxides. The examples also serve to illustrate the procedures used in forming the said polyhalohydrin ethers and ether epoxides. In each of the following examples, unless otherwise indicated, the viscosities are those of the "Gardner-Holdt" scale, and average molecular weights are those obtained by standard freezing point depression method with benzophenone.

Example I

In a three-liter, three-neck glass reaction flask, equipped with a thermometer, dropping funnel and an electrically-driven stirrer, were placed 552 grams (6 mols) of glycerol and 5 ccs. of an ethyl ether solution of $BF_3$ (45% $BF_3$). The mixture was agitated and heated to 65° C., whereupon heating was discontinued. Epichlorhydrin was then added gradually through the dropping funnel to the mixture, at such a rate that the temperature varied from 70–90° C., with external cooling being applied to the flask. The epichlorhydrin, 1665 grams (18 mols) was added during a period of 1 hour and 49 minutes. The reaction mixture was stirred for another hour, without further cooling; during this period the temperature was 60–87° C. The substantially colorless liquid product so obtained had a viscosity of $Z_4$.

A portion of the aforesaid product, 370 grams, and 900 ccs. of dioxane were placed in a three-liter, three-neck glass flask fitted with a thermometer, reflux condenser and an electrically-driven stirrer. The dioxane solution was stirred and three hundred grams of sodium aluminate ($Na_2Al_2O_4$) were added thereto. The resulting mixture was then refluxed at 93° C. for 8¾ hours. The mixture was then cooled and filtered through diatomaceous earth on a Büchner funnel. The filter cake thus formed was washed with dioxane. The filtrate and dioxane washings were combined and vacuum distilled to a maximum temperature of 205° C. at 20 mms., whereupon dioxane was removed as the distillate. The product, 261 grams, was a pale-yellow liquid having a viscosity of D; a chlorine content of 9.1 per cent; an average molecular weight of 324; and an epoxide equivalent of 149, thus having an average of about 2.2 epoxide groups per molecule.

The epoxide content of the epoxide product was determined by heating a sample of the epoxide composition with an excess of pyridine containing pyridine hydrochloride, at the boiling point for 20 minutes, and back titrating the excess pyridine hydrochloride with 0.1 normal sodium hydroxide, using phenolphthalein as indicator. One HCl is considered equivalent to one epoxide group. The pyridine-pyridine hydrochloride solution is made by adding 16 ccs. of concentrated hydrochloric acid per liter of pyridine. By epoxy equivalent we mean that weight of the material which contains one epoxy group.

Example II

A quantity, 187 grams, of the glycerol-epichlorhydrin condensate described in Example I above, 164 grams of sodium aluminate and 400 ccs. of dry diethyl ether, were placed in a one-liter, three-neck glass flask fitted with a thermometer, a reflux condenser and an electrically-driven stirrer. The mixture so formed was agitated at 25-34° C. for four days. Most of the ether had evaporated at the end of the four day period, whereupon the reaction mixture was diluted with additional diethyl ether and filtered. The filtrate was distilled thereby removing diethyl ether. The liquid product, 89 grams, thus obtained was substantially colorless, had an epoxide equivalent of 146 and contained about 9.1 per cent chlorine.

*Example III*

In contrast to sodium aluminate in Examples I and II above, and various silicates and zincates in the following examples, is the substantially lower degree of effectiveness of sodium hydroxide as a dehydrohalogenating agent, viz:

A quantity, 187 grams, of the glycerol-epichlorhydrin condensate described in Example I above, and 300 ccs. of dry diethyl ether were placed in a one-liter, three-neck glass flask equipped with a thermometer, a reflux condenser and an electrically-driven stirrer. The flask was cooled in salt-ice bath. At a temperature of −2 to −5° C., the ether solution was agitated and 80 grams of powdered sodium hydroxide were added thereto during a period of 67 minutes. The resulting mixture was then stirred for three hours, the temperature rising to 19° C. at the end of this period. The ether solution was decanted from the flask and ether distilled therefrom. The product, a colorless liquid product, had an epoxide equivalent of 126 and a chlorine content of about 7.8 per cent. Only 30 grams of the product were obtained; this corresponds to about 21 per cent of the theoretical yield. This is in contrast to yields of about 64 per cent in Example II and about 93 per cent in Example I.

Similar results, with low yield of product and/or low epoxide content of product, have been obtained with a large number of alkaline materials disclosed in the prior art referred to hereinabove.

*Example IV*

A quantity, 186 grams, of the glycerol-epichlorhydrin condensate described in Example I above, 20 grams of water and 300 ccs. of dioxane were placed in a one-liter, three-neck glass flask equipped with a thermometer, a reflux condenser and an electrically-driven stirrer. The dioxane solution so formed was agitated and 80 grams of finely powdered anhydrous sodium ortho silicate ($Na_4SiO_4$; 60 mesh) were added thereto. The resulting mixture was refluxed at 93° C. for ½ hour. The mixture was then cooled and filtered as described above in Example I. The filtrate and dioxane washings were combined and vacuum distilled. The product, 139 grams, had an epoxide equivalent of 139; a molecular weight of 295, thus corresponding to an average of 2.1 epoxide groups per molecule; a viscosity of D+; and a chlorine content of 6.4 per cent.

*Example V*

A quantity, 186 grams, of an epichlorhydrin-glycerol condensate prepared as described in Example I above, 230 grams of sodium metasilicate pentahydrate ($Na_2SiO_3.5H_2O$) and 300 ccs. of dioxane were placed in a flask such as described in Example II above. The resulting solution was stirred and refluxed at 91° C. for 3 hours. A paste, presumably a mixture of silica gel and sodium chloride, was formed and stuck to the wall of the flask and the stirrer. The solution was poured from the flask and vacuum distilled. The product, 150 grams, had an epoxide equivalent of 150, and contained chlorine.

*Example VI*

An epichlorhydrin-glycerol condensate, 186 grams, prepared as described in Example I above was dissolved in 300 ccs. of dioxane and treated with 145 grams of a hydrated sodium sesquisilicate ($3Na_2O.2SiO_2.11H_2O$), in the manner described in Examples IV-V above. The reaction mixture was poured from the flask and vacuum distilled. The product, 139 grams, had an epoxide equivalent of 148; a viscosity of E; and a chlorine content of 9.6.

*Example VII*

An epichlorhydrin-glycerol condensate, 186 grams, prepared as described in Example I above was dissolved in 300 ccs. of dioxane and treated with 90 grams of sodium zincate (30% ZnO), in the manner described in Examples IV-VI above. The reaction mixture was heated at 70° C. for ½ hour, then cooled and filtered as described in Example I. The filtrate and dioxane washings were combined and vacuum distilled. The product, 134 grams, had an epoxide equivalent of 143; a viscosity of D; and a chlorine content of 8.9 per cent.

*Example VIII*

Glycerol and epichlorhydrin, in a molar ratio of 1:2, were condensed in the manner described in Example I above. A quantity, 417 grams, of the condensate, was dissolved in 400 ccs. of dioxane and was treated with 180 grams of sodium zincate (30% ZnO), as described in Example VII above. The dioxane solution thus formed was heated at 65-70° C. for 1½ hours, then cooled, filtered and the filtrate vacuum distilled. The liquid product, 305 grams, had an epoxide equivalent of 167; a viscosity of N; and a chlorine content of 2.2 per cent.

*Example IX*

Glycerol and epichlorhydrin, in a molar ratio of 1 to 4, were condensed in the manner described in Example I above. A quantity, 231 grams, of the condensate was dissolved in 300 ccs. of dioxane and was treated with 190 grams of sodium aluminate ($Na_2Al_2O_4$), as described in Example II. The dioxane solution thus formed was refluxed at 97° C. for 3 hours, then cooled, filtered and vacuum distilled. The liquid product 168 grams, had an epoxide equivalent of 144; a viscosity of F; and a chlorine content of 10.8 per cent.

*Example X*

One mol of trimethylol propane and three mols of epichlorhydrin were condensed in the manner described in Example I. The reaction temperature was 32-69° C. and the total reaction time was 5 hours.

The condensate, 415 grams, was dissolved in 600 ccs. of dioxane and treated with 275 grams of sodium aluminate ($Na_2Al_2O_4$), in the manner described in the preceding examples with $Na_2Al_2O_4$. The product—299 grams—obtained, after vacuum distillation to 200° C. at 20 mms., was a pale yellow liquid having an epoxide equivalent of 151 and an average molecular weight of 292, indicating an average of 1.9 epoxide groups per molecule. The product so prepared contained chlorine.

Example XI

Epichlorhydrin (185 grams, 2 mols) and 1,12-dihydroxy-octadecane (diolin; 286 grams, 1 mol) were condensed in the manner described in Example I above, the reaction temperature and reaction time being 41–69° C. and 3 hours, respectively. The condensate so formed—475 grams—was treated with 185 grams of sodium aluminate in 600 ccs. of dioxane, at 96° C. for 3 hours. The reaction mixture which formed was treated as described in preceding examples involving sodium aluminate. A colorless liquid, 412 grams, was obtained; it had an epoxide equivalent of 485, and a chlorine content of 6.7 per cent.

Example XII

Epichlorhydrin (303 grams; 3.3 mols) and erythritol (100 grams; 0.84 mol) were condensed at 90–143° C. for 1 hour in the manner described in Example I above. The condensate, 403 grams, was treated with 500 grams of sodium zincate (30% ZnO) in 500 ccs. of dioxane and 10 ccs. of water. The reaction temperature was 90–98° C. and the reaction time was 3 hours. The reaction mixture thus obtained was treated as described in Example VIII above. The liquid product, 217 grams, had a chlorine content of 10.1 per cent and an epoxide equivalent of 185.

Example XIII

Epichlorhydrin (463 grams; 5 mols) and triglycerol (240 grams; 1 mol) were condensed in the manner described in Example I, with the temperature 92–130° C. for 2¼ hours. A quantity, 235 grams, of the condensate was treated with 170 grams of sodium zincate (30% ZnO) in 300 ccs. of dioxane and 20 ccs. of water, at 96° C. for 3 hours. The product, obtained as described in Example VII above, weighed 164 grams. The product had an epoxide equivalent of 164 and an average molecular weight of 421, representing an average of 2.6 epoxide groups per molecule; it also had a chlorine content of 8.5 per cent and a viscosity of U.

Example XIV

Epichlorhydrin (555 grams, 6 mols) and polyallyl alcohol (400 grams) were condensed at 90–95° C. for five hours, according to the procedure described in Example I above. The condensate, 955 grams, was treated with 540 grams of sodium zincate (30% ZnO) in 1000 ccs. of dioxane, at 97° C. for three hours. The reaction mixture so obtained was treated as described in Example VII above. The liquid product, 568 grams, isolated from said reaction mixture, had an epoxide equivalent of 221 and an average molecular weight of 540, representing an average of 2.4 epoxide groups per molecule. Chlorine found: 6.2 per cent.

Example XV

Epichlorhydrin (491 grams, 5.3 mols) was condensed with dextrose (138 grams, 0.7 mol) and ethylene glycol (46 grams, 0.7 mol) at 100° C.–136° C. for 1⅔ hours, according to the procedure described in Example I above. The condensate, 629 grams, was reacted with 925 grams of sodium zincate in 600 ccs. of dioxane and 15 ccs. of water, at 96° C. for three hours. The reaction mixture was treated in the manner described in Example VII above. The liquid product, 317 grams, had an epoxide equivalent of 268 and contained 10.2 per cent chlorine.

Example XVI

Epichlorhydrin (648 grams, 7 mols) was condensed with sorbitol (182 grams, 1 mol) at 91–108° C. for 2½ hours, in the manner described in Example I. A quantity, 208 grams, of the condensate so obtained was treated with 105 grams of sodium zincate in 500 ccs. of dioxane, at 70° for ½ hour. The reaction mixture thus formed was treated in the manner described in Example VII above. The liquid product, 150 grams, had an epoxide equivalent of 216 and an average molecular weight of 679, representing an average of 3.1 epoxide groups per molecule. The chlorine content of the product was 10.2 per cent.

Example XVII

Epichlorhydrin (278 grams, 3 mols) was condensed with sorbitol (182 grams, 1 mol) at 103–114° C. for 1¼ hours as described in Example I above. A portion, 231, of the condensate was reacted with 164 grams of sodium aluminate and 300 ccs. dioxane and 15 ccs. of water, at 95° C. for three hours. The reaction mixture was treated in the manner described in Example I above, and the liquid products obtained had an epoxide equivalent of 202. The liquid product contained 9.3% chlorine.

Example XVIII

Epichlorhydrin (555 grams, 6 mols) was condensed with sorbitol (182 grams, 1 mol) at 90–109° C. for three hours, as described in Example I above. The quantity, 213 grams, of the condensate was treated with 175 grams of sodium aluminate, 400 ccs. dioxane and 15 ccs. of water, at 96° C. for 1¼ hours. The reaction mixture was treated in the manner described in Example I above. The liquid product, 147 grams, so obtained contained chlorine, had an epoxide equivalent of 214 and an average molecular weight of 576 indicating an average of 2.7 epoxide groups per molecule.

Example XIX

Epichlorhydrin (1110 grams, 12 mols) was condensed with pentaerythritol (317 grams) and trimethylol propane (134 grams, 0.8 mol) at 134–153° C. for 2¼ hours. The pentaerythritol used was a technical grade comprising a mixture of approximately 50% dipentaerythritol and 50% pentaerythritol and related compounds. The reaction mixture thus formed was treated in the manner described in Example I above. The quantity, 223 grams, of the condensate thus obtained was reacted with 175 grams of sodium aluminate in 300 ccs. of dioxane and 20 ccs. of water, at 96° C. for three hours. The latter reaction mixture was treated in the manner described in Example VII above. The liquid product, 167 grams, separated from said reaction mixture, had an epoxide equivalent of 154 and an average molecular weight of 421, corresponding to an average of 2.7 epoxide groups per molecule. The liquid product was also characterized by viscosity of R and contained 7.6% chlorine.

Example XX

A mixture of ethylene glycol (124 grams, 2 mols), powdered nitration grade pentaerythritol (272 grams, 2 mols) and an ether solution of $BF_3$ (3 ccs.) was heated to 120° C. Epichlorhydrin was then added gradually with the temperature maintained at 120–140° C. Additional powdered pentaerythritol and additional $BF_3$ catalyst were added at intervals, until a total of 952 grams (7 mols) of pentaerythritol were added during four hours, whereupon an extremely viscous liquid product was formed. The liquid product contained only a small amount of pentaerythritol. The condensate was treated in the manner described in Example I.

A quantity of 190 grams, of the aforesaid condensate was treated with 180 grams of sodium aluminate in 300 ccs. of dioxane, 15 ccs. of water, at 98° C. for three hours. The reaction mixture thus formed was treated in the manner described in Example I above, and a liquid product, 139 grams, was separated therefrom. The liquid product had an epoxide equivalent of 150 and an average molecular weight of 340 representing an average of 2.3 epoxide groups per molecule. The product contained 9.0% chlorine.

Example XXI

Epichlorhydrin (1390 grams, 15 mols) was condensed with a mixture of dipentaerythritol (381 grams, 1.5 mols) and trimethylol propane (304 grams, 3 mols) at 129–153° C. for three hours, similar to the procedure described in Example I above. A portion (210 grams) of the condensate so obtained was treated with 164 grams of sodium aluminate in 300 ccs. of dioxane and 20 ccs. of water at 96° C. for three hours. The reaction mixture so formed was treated in the manner described in Example VII above. The liquid product, 140 grams, separated from the reaction mixture had an epoxide equivalent of 169 and an average molecular weight of 421, thus corresponding to an average of 2.5 epoxide groups per molecule. Chlorine found: 5.9 per cent.

Example XXII

Epichlorhydrin (695 grams, 7.5 mols) was condensed with a mixture of triglycerol (120 grams, 0.5 mols) and pentaerythritol (148.5 grams) at 151–158° C. for 2¼ hours, as described in Example I above. The pentaerythritol used was a technical grade, described in Example XIX above. A quantity, 243 grams, of the condensate so obtained was treated with 175 grams of sodium aluminate in 300 ccs. of dioxane and 20 ccs. of water at 96° C. for three hours. The reaction procedure described in Example VII above was followed in treating the reaction mixture, from which 183 grams of a liquid product were separated. The chlorine containing product had an epoxide equivalent of 167 and an average molecular weight of 438 indicating an average of 2.6 epoxide groups per molecule.

Example XXIII

A mixture of diglycerol (166 grams, 1.0 mol), powdered pentaerythritol (170 grams, 1.25 mols) and 7 ccs. of $BF_3$ in diethyl ether solution was heated with stirring to 118° C., ethylene oxide gas was then introduced therein until a total of 157 grams of ethylene oxide had reacted. A separate portion (3 ccs.) of the $BF_3$ solution was then added, followed by the addition of 832 grams (9 mols) of epichlorhydrin during a period of 3½ hours at 94–110° C. The quantity, 222 grams, of the condensate so obtained was treated with 155 grams of sodium aluminate in 300 ccs. of dioxane and 20 ccs. of water at 97° C. for three hours. The reaction mixture so formed was treated in the manner described in Example II above. The liquid product, 156 grams, had an epoxide equivalent of 164 and an average molecular weight of 421, corresponding to an average of 2.6 epoxide groups per molecule. The product contained 6.9 chlorine and had viscosity of K.

Example XXIV

A soybean monoglyceride was prepared by heating 882 grams of a soybean oil, 193 grams of glycerol and 2 grams of calcium acetate at 200–210° C. for 1½ hours. A quantity 711 grams, of the monoglyceride so obtained was condensed with 370 grams (4 mols) of epichlorhydrin at 95–110° C. for 15 minutes, according to the procedure described in Example I above.

A quantity of the epichlorhydrin product, 360 grams, was treated with 80 grams of sodium zincate in 600 ccs. of dioxane, at 65° C. for 1¼ hours. The reaction mixture so formed was treated in the manner described in Example VII above. The liquid product, 255 grams, had an epoxide equivalent of 455 and contained 2.2% chlorine and had a viscosity of D.

Example XXV

Glycerol phthalate was prepared by heating 444 grams of phthalic anhydride and 582 grams of glycerol at 200–220° C. for three hours, a stream of $CO_2$ being blown through the reaction mixture. The glycerol phthalate so obtained had an acid value of 3.7. A quantity, 314 grams, of this phthalate was dissolved in 600 ccs. of dioxane and condensed with 370 grams (7 mols) of epichlorhydrin at 95–105° C. for 15 minutes. The reaction mixture so formed was treated in the manner described in Example I above.

A quantity, 342 grams, of the condensate so formed was treated with 120 grams of sodium zincate in 200 ccs. of dioxane, at 65–70° C. for 2¼ hours. The reaction mixture was treated as described in Example VII above. The liquid product, 345 grams, had an epoxide equivalent of 312 and contained 2.3% chlorine.

Example XXVI

Epichlorhydrin (595 grams; 6.5 mols) and 2-ethyl-2-butyl-1, 3-propanediol (516 grams; 3.3 mols) were condensed in the manner indicated in Example I. The condensate, 1111 grams, was treated with sodium aluminate, 1050 grams, in 1000 ccs. of dioxane and 25 ccs. of water, at 100° C. for 3 hours. The reaction mixture so obtained was treated with sodium aluminate as described in Example II. The liquid product, 736 grams, so obtained had an epoxide equivalent of 198 and a chlorine content of 15.7 per cent.

USES

The polyhalohydrin ethers derived from the condensation of epihalohydrins with the aforesaid polyhydric materials have many other uses in addition to their use as intermediates in the preparation of the halogen containing polyepoxides of this invention. For example they can be reacted with alkali metal phenolates (including mono and polyhydric phenols as well as mixtures of monohydric and polyhydric phenols) to give new resinous materials. By proper choice of reaction proportions, etc. and the use of excess alkali in some cases, the nature of the resinous products can be varied widely. Thus resins can be prepared which are (1) halogen and hydroxyl containing aryl ethers, (2) halogen free hydroxyl containing aryl ethers, and (3) halogen containing epoxy aryl ethers. These resinous products have a variety of uses such as plasticizers for other resins, intermediates for esterification with unsaturated fatty acids to give drying varnishes, esterification with polybasic acids and anhydrides to give infusible resins, etc.

In addition these polyhalohydrin ethers can be reacted with such reagents as sodium bicarbonate, sodium cyanide, sodium thiocyanate, sodium hydrosulfide, sodium sulfide, sodium polysulfides, ammonia, amines, etc. to replace halogen with groups as —OH, CN, —SCN, —SH, —S, —S$_x$, —NH$_2$, —NHR, —NR$_2$, etc.

The halogen-containing ether epoxide products obtained as described hereinabove have many uses and applications. As is well known to those familiar with the art, epoxides are reactive with many types of chemical compounds and, as a result, are useful as intermediates. For example, epoxides may be reacted with acids, alcohols, amines, amides, mercaptans, phenols, etc., to form a variety of useful products among which are plastics, plasticizing agents, resins, detergents, emulsifying agents, dyes, pharmaceuticals, insecticides, etc. In addition, the halogen-containing ether epoxides contemplated herein may also be reacted through their halogen atom or atoms, whereupon said halogen is replaced by another atom or group.

One particularly advantageous use of certain of the halogen-containing ether epoxides of this invention is as a brush cement, especially as a paint brush cement; this forms the subject matter of copending application Serial No. 754,079, filed June 11, 1947 by Carl E. Bixler, now Patent 2,512,996. In the latter application, said ether epoxides are shown to be reactive solvents for resinous epoxides. They may also be used as resin plugs or dividers in brushes, particularly paint brushes and as brush handles, all as described in a second copending application of Carl E. Bixler, Serial No. 785,388, filed November 12, 1947, now Patent 2,512,997. Another use for said ether epoxide is as a film-forming material. Still another use of the halogen-containing ether epoxides is as a stabilizer for halogen-containing synthetic resins and elastomers, which tend to evolve hydrochloric acid; typical of such resins and elastomers are polyvinyl chloride, polyvinylidene chloride and neoprene (chloroprene polymers). Said ether epoxides may also be used as coatings for metals, as wire coating, and as castings or potting materials. They may also be used as intermediates for preparing addition agents for petroleum fractions, such as lubricating oils.

Further applications for the epoxide products described hereinabove are described in applications Serial Nos.: 635,154, 653,156 and 653,155, filed March 8, 1946, now Patents Nos. 2,510,886, 2,521,912 and 2,521,911; 661,059 and 661,060, filed April 10, 1946, now Patents Nos. 2,528,359 and 2,528,360; 681,595, filed July 5, 1946; and 707,991 and 707,992, filed November 5, 1946, now Patents Nos. 2,502,145 and 2,542,664.

It is to be understood that the typical examples present hereinabove illustrate the invention and are not to be construed as limitations thereof. Rather, the invention is to be construed in the light of the language of the appended claims.

This application is a continuation-in-part of my prior application Serial No. 754,080, filed June 11, 1947, now Patent 2,538,072.

I claim:

1. Halogen-containing polyether polyepoxide compositions of matter, obtainable by partial dehydrohalogenation of polyhalohydrin polyethers of aliphatic polyhydric alcohols containing from 3 to 6 hydroxyl groups, said composition being a mixture of epoxide products having an average composition expressed by the following general formula

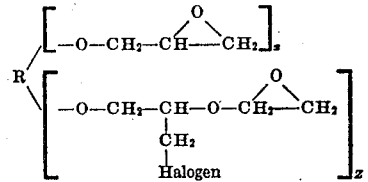

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxyl groups thereof with the epoxide ether groups of the above formula and any remaining groups of the residue being free hydroxyl groups.

2. A product as defined in claim 1 in which the halogen is chlorine.

3. A halogen-containing polyether polyepoxide composition of matter, said composition being a mixture of ethers of polyhydric alcohols, which aliphatic polyhydric alcohols have from 2 to 6 hydroxyl groups, with at least two of the hydroxyl groups replaced in part by the group

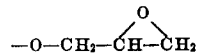

and in part by the group

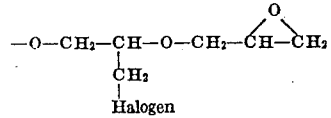

and any hydroxyl groups which are not so replaced being unchanged hydroxyl groups.

4. A halogen-containing polyether polyepoxide composition of matter, said composition being a mixture of ethers of an aliphatic trihydric alcohol, with at least two of the hydroxyl groups replaced in part by the group

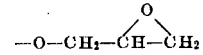

and in part by the group

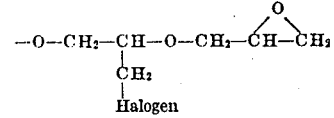

and any hydroxyl group which is not so replaced being an unchanged hydroxyl group.

5. A halogen-containing polyether polyepoxide composition of matter, said composition being a mixture of ethers of glycerol, with at least two of the hydroxyl groups of the glycerol replaced in part by the group

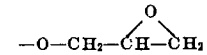

and in part by the group

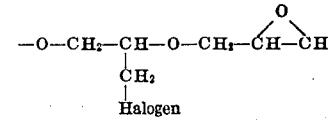

and any remaining hydroxyl group which is not so replaced being an unchanged hydroxyl group.

6. Compositions as defined in claim 3 in which the halogen is chlorine.

7. Compositions as defined in claim 4 in which the halogen is chlorine.

8. Compositions as defined in claim 5 in which the halogen is chlorine.

JOHN D. ZECH.

REFERENCES CITED

The following references are of record in the file of this patent:

UNITED STATES PATENTS

| Number | Name | Date |
|---|---|---|
| 2,061,377 | Groll et al. | Nov. 17, 1936 |
| 2,070,990 | Groll et al. | Feb. 16, 1937 |
| 2,314,039 | Evans et al. | May 16, 1943 |
| 2,327,053 | Marple et al. | Aug. 17, 1943 |

FOREIGN PATENTS

| Number | Country | Date |
|---|---|---|
| 518,057 | Great Britain | Feb. 15, 1940 |

OTHER REFERENCES

Rosof and Schlorlemer: "Treatise on Chemistry," vol. II, p. 712; MacMillan and Co., London (1907).